(12) United States Patent
Ament et al.

(10) Patent No.: US 7,478,528 B2
(45) Date of Patent: Jan. 20, 2009

(54) OXYGEN BASED PARTICULATE FILTER REGENERATION STRATEGY

(75) Inventors: Frank Ament, Troy, MI (US); David B. Brown, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 41 days.

(21) Appl. No.: 11/539,904

(22) Filed: Oct. 10, 2006

(65) Prior Publication Data

US 2008/0083212 A1 Apr. 10, 2008

(51) Int. Cl.
*F01N 3/00* (2006.01)
(52) U.S. Cl. .............. 60/295; 60/274; 60/276; 60/297
(58) Field of Classification Search .......... 60/274, 60/276, 285, 295, 297, 311
See application file for complete search history.

(56) References Cited

U.S. PATENT DOCUMENTS

| 5,067,973 | A  | * | 11/1991 | Pattas ........................ 95/12 |
| 6,988,361 | B2 | * | 1/2006  | van Nieuwstadt et al. ..... 60/295 |
| 7,007,462 | B2 | * | 3/2006  | Kitahara ...................... 60/285 |
| 7,207,171 | B2 | * | 4/2007  | Nagaoka et al. .............. 60/295 |
| 7,299,626 | B2 | * | 11/2007 | Barasa et al. ................. 60/297 |

\* cited by examiner

*Primary Examiner*—Binh Q. Tran

(57) ABSTRACT

A particulate filter regeneration method for an internal combustion engine system is provided. The method includes: receiving an outlet temperature signal corresponding to a temperature at an outlet of a particulate filter; receiving an oxygen signal corresponding to an oxygen level in exhaust flowing from said particulate filter; and controlling at least one of airflow and fuel based on said oxygen level such that said outlet temperature is within a desired range.

20 Claims, 3 Drawing Sheets

OXYGEN BASED PARTICULATE FILTER REGENERATION STRATEGY

FIELD OF THE INVENTION

The present invention relates to particulate filters and more particularly to methods and systems for controlling the temperature of a particulate filter during regeneration.

BACKGROUND OF THE INVENTION

Diesel Particulate Filters (DPF) are used on diesel engines to reduce emissions of particulate matter (soot) generated during a heterogeneous combustion process. These filters must be cleaned or "regenerated" when the filter is determined full of soot. An engine control system can estimate the DPF accumulation, and determine when the filter needs regeneration. Once the filter is determined to be full, the control system will enable regeneration by modifying the combustion process and/or injecting fuel into the exhaust system to increase the temperature of exhaust flowing into the DPF. The elevated exhaust temperatures will initiate oxidation of the stored soot within the DPF.

Normally, this process is well controlled, and results in acceptable filter temperatures and durability. However, under some conditions the filter can be overloaded with particulates or regenerated during conditions that result in run-away temperatures. These excessively high temperatures can result in filter failure due to cracking from thermal stress, or even melting of the filter substrate.

In order to improve DPF durability, peak temperatures within the DPF should be controlled. One method of controlling peak temperatures includes limiting particulate loading. This cannot always be guaranteed due to customer driving cycles, ambient conditions, and/or variations in engine operating modes. Another method includes limiting the heat input into the DPF by the fuel injection process. This too is not always effective, since the stored particulate mass is often sufficient to lead to highly exothermic reactions that can damage the DPF material.

SUMMARY OF THE INVENTION

Accordingly, a particulate filter regeneration method for an internal combustion engine system is provided. The method includes: receiving an outlet temperature signal corresponding to a temperature at an outlet of a particulate filter; receiving an oxygen signal corresponding to an oxygen level in exhaust flowing from said particulate filter; and controlling at least one of airflow and fuel based on said oxygen level such that said outlet temperature is within a desired range.

In other features, a system for controlling regeneration of a particulate filter is provided. The system includes: an outlet temperature sensor that senses a temperature at an outlet of the particulate filter and that generates a temperature signal based on said outlet temperature; an air fuel sensor that senses an oxygen level in exhaust flowing from the particulate filter and generates an oxygen signal based on said oxygen level; and a control module that receives said outlet temperature signal and said oxygen signal and controls regeneration of said particulate filter based on said outlet temperature signal and said oxygen signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
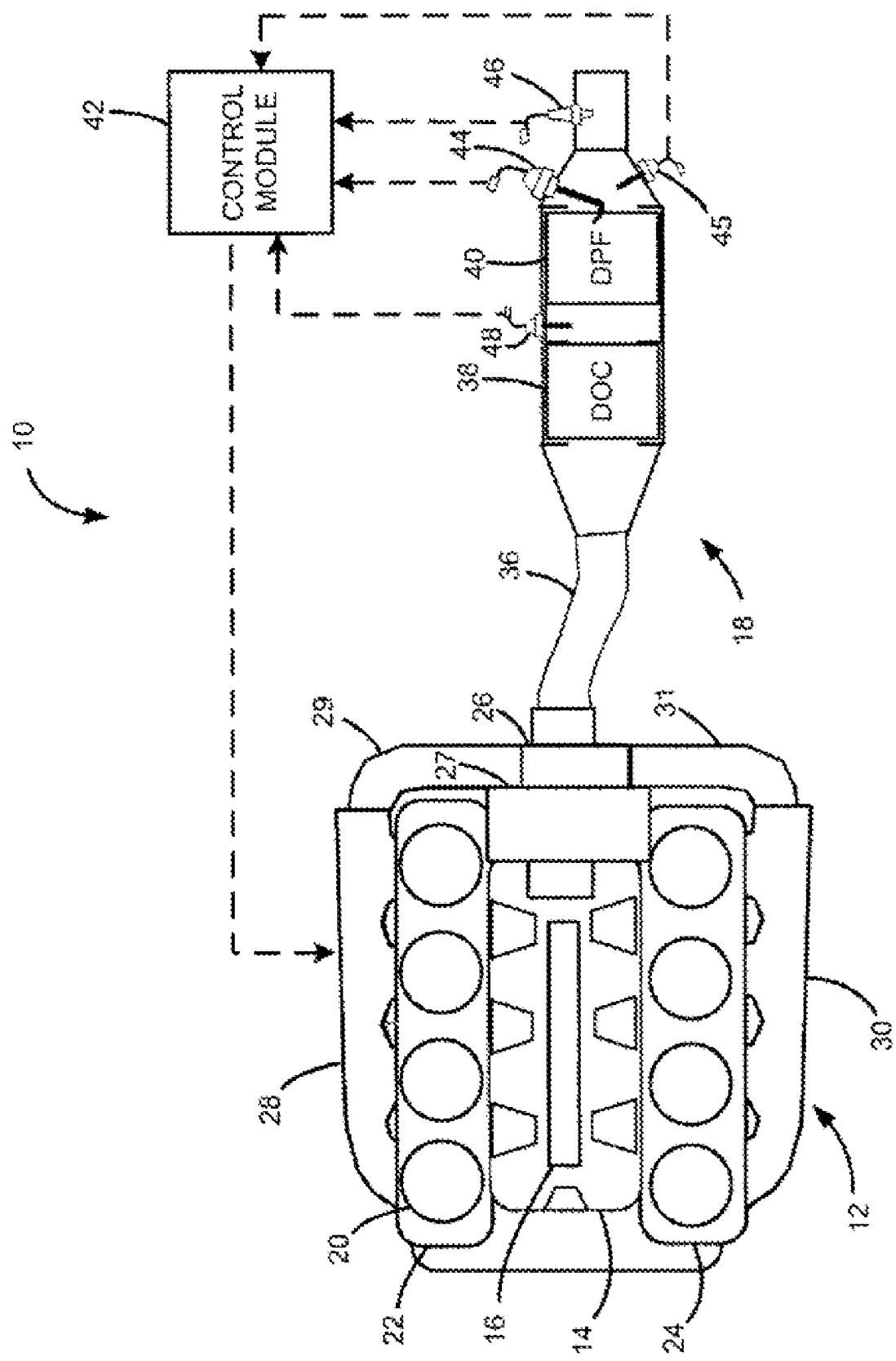
FIG. 1 is a schematic view of an exemplary diesel engine system that includes a particular filter regeneration system according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that executes one or more software or firmware programs, a combinational logic circuit and/or other suitable components that provide the described functionality.

Referring now to FIG. 1 an exemplary diesel engine system 10 is schematically illustrated in accordance with the present invention. It is appreciated that the diesel engine system 10 is merely exemplary in nature and that the particulate filter regeneration system described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

The diesel engine system 10 includes a diesel engine 12, an intake manifold 14, a common rail fuel injection system 16 and an exhaust system 18. The exemplary engine 12 includes eight cylinders 20 configured in adjacent cylinder banks 22,24 in V-type layout. Although FIG. 1 depicts eight cylinders (N=8), it can be appreciated that the engine 12 may include additional or fewer cylinders 20. For example, engines having 2, 4, 5, 6, 8, 10, 12 and 16 cylinders are contemplated. It is also anticipated that the particulate filter regeneration control of the present invention can be implemented in an inline-type cylinder configuration.

Air is drawn into the intake manifold 14 through a throttle (not shown). Air is drawn into the cylinders 20 from the intake manifold 14 and is compressed therein. Fuel is injected into cylinder 20 by the common rail injection system 16 and the heat of the compressed air ignites the air/fuel mixture. The exhaust gases are exhausted from the cylinders 20 into the exhaust system 18. In some instances, the diesel engine system 10 can include a turbocharger that uses an exhaust driven turbine 26 to drive a compressor 27 that compresses the air entering the intake manifold 14. The compressed air typically passes through an air cooler (not shown) before entering into the intake manifold 14.

The exhaust system 18 includes exhaust manifolds 28,30, exhaust conduits 29,31, and 36, a diesel oxidizing catalyst (DOC) 38, and a diesel particulate filter (DPF) 40. The exhaust manifolds 28,30 direct the exhaust exiting corresponding cylinder banks 22,24 into the exhaust conduits 29,31. The exhaust is directed into the turbocharger to drive the turbine 26. A combined exhaust stream flows from the turbocharger through the exhaust conduit 36, the DOC 38, and the DPF 40. The DPF 40 filters particulates from the combined exhaust stream as it flows to the atmosphere.

A control module 42 regulates operation of the diesel engine system 10 according to the oxygen based particulate filter regeneration method of the present invention. More particularly, the control module 42 communicates with a DPF outlet temperature sensor, a wide-range air fuel sensor 46, and a DPF inlet temperature sensor 48. The DPF outlet temperature sensor generates a signal indicating a temperature at the outlet of the DPF 40. In various embodiments, the DPF outlet temperature sensor senses a temperature of the DPF substrate as shown by temperature sensor 44 and generates a substrate temperature signal. In various embodiments, the DPF outlet temperature sensor senses a temperature of gases exiting the DPF as shown by temperature sensor 45 and generates a gas temperature signal. The wide-range air fuel sensor 46 generates a signal indicating the amount of oxygen ($O_2$) in the exhaust. The DPF inlet temperature sensor 48 generates a signal indicating the temperature of exhaust flowing into the DPF 40.

The control module 42 determines when regeneration is needed and controls engine operation to allow regeneration to occur. Based on the outlet temperature signal and the oxygen signal, control continues to control engine operation at regeneration levels until regeneration is complete.

Figure 2:
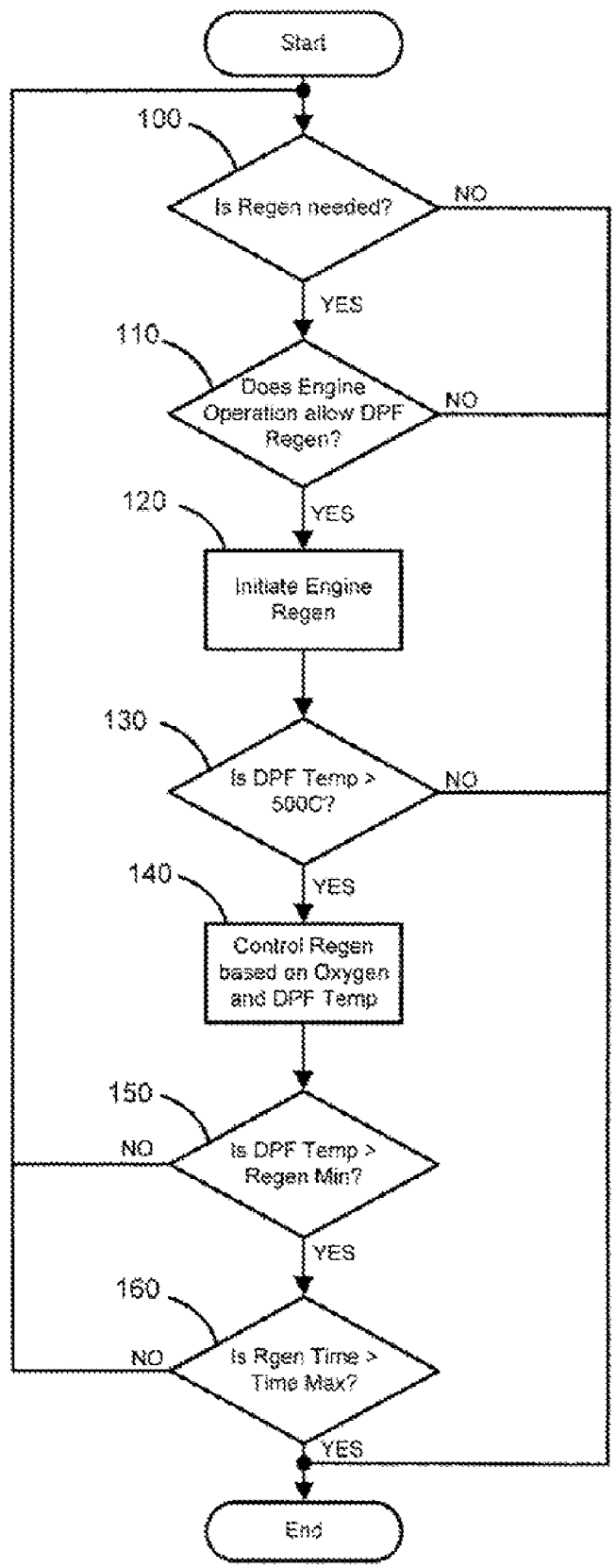
FIG. 2 is flow chart illustrating the oxygen based particulate fitter regeneration method according to the present invention.

Referring now to FIG. 2, a flowchart illustrates steps performed by the oxygen based particulate filter regeneration method. In step 100, control estimates soot accumulation in the DPF and determines whether regeneration is needed based on an accumulation threshold. If the DPF is full, control determines whether engine operating conditions are sufficient to permit regeneration in step 110. If the DPF is not full, control proceeds to the end. If regeneration is permitted, control enables regeneration by modifying the combustion process and/or injecting fuel into the exhaust stream to raise the DPF inlet temperature above a soot light-off threshold in step 120. The elevated exhaust temperature initiates oxidation of the stored soot within the DPF. If regeneration is not permitted, control proceeds to the end.

Figure 3:
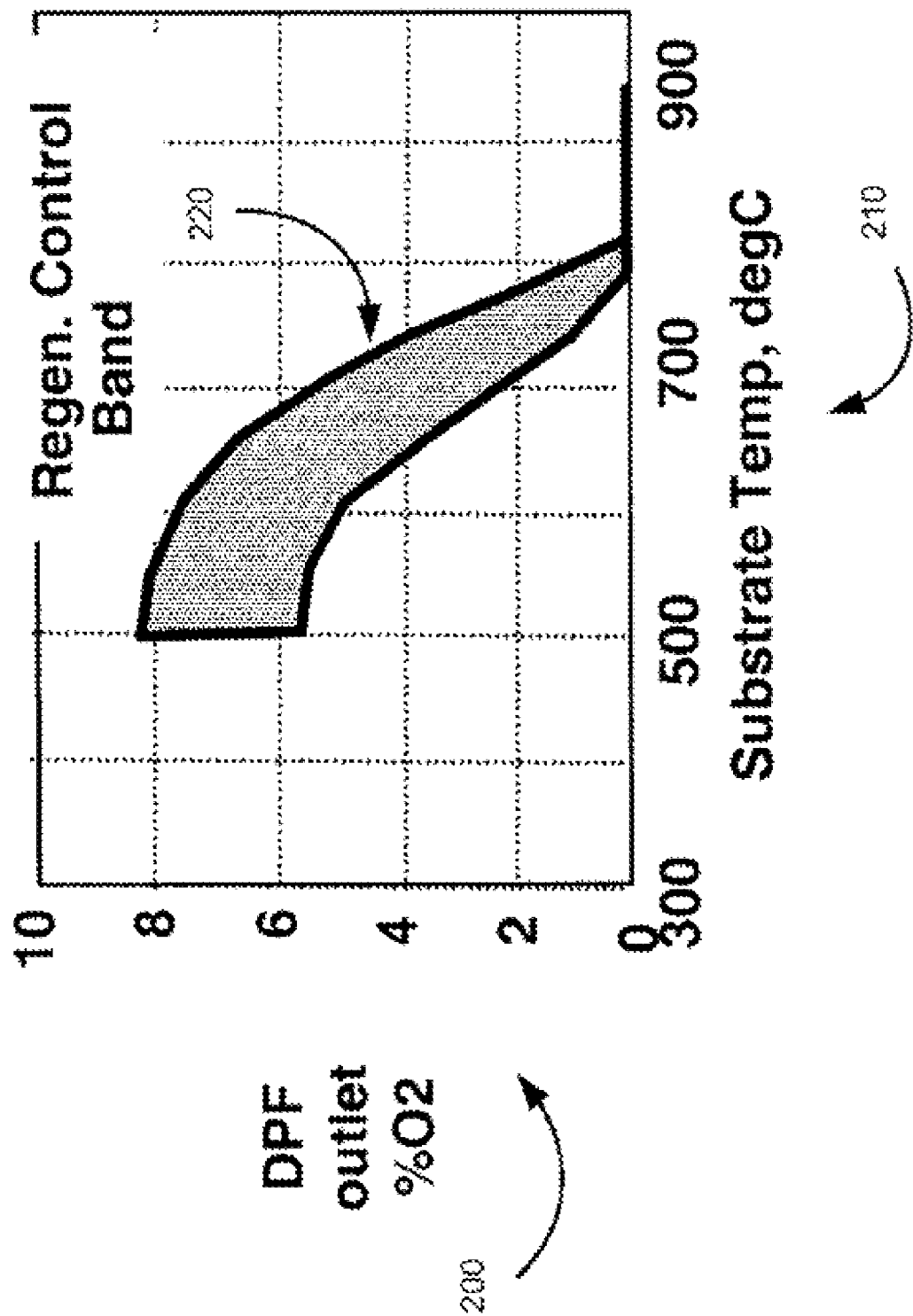
FIG. 3 is a graph illustrating a control band of the present invention.

If regeneration has begun and the temperature signal indicates a substrate temperature of greater than a selectable threshold in step 130, the proper temperature for regeneration is maintained by commanding air and/or fuel such that the oxygen level indicated by the air fuel sensor is within a pre-defined control band. In an exemplary embodiment, the selectable threshold can be five hundred degrees Celsius. FIG. 3 illustrates an exemplary control band. The oxygen level is indicated along the y-axis at 200 and ranges from zero percent to ten percent. The DPF outlet temperature is indicated along the x-axis at 210 and ranges from three hundred degrees Celsius to nine hundred degrees Celsius. An exemplary control band is indicated at 220. The control band indicates the range at which the oxygen levels should be maintained in order to control the temperature of the DPF and to completely burn the accumulated soot.

Referring back to FIG. 2, as regeneration occurs in step 140, the soot mass is reduced over a period of time. The time for complete regeneration of the stored soot mass can be estimated from the known DPF conditions. A maximum regeneration time can be pre-determined for the particular system. If the DPF outlet temperature in step 150 remains above a minimum temperature (e.g., 550 degrees Celsius) and the regeneration time in step 160 is greater than the regeneration time max (e.g., 7 minutes), the filter is clean and regeneration is complete. Control proceeds to the end. If the DPF outlet temperature is above the minimum temperature, but for insufficient time, control loops back to step 100 and regeneration will continue to complete the soot oxidation process.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A system for controlling regeneration of a particulate filter, comprising:
    a substrate temperature sensor that senses a temperature of a particulate filter substrate and that generates a temperature signal based on said particulate filter substrate temperature;
    an air fuel sensor that senses an oxygen level in exhaust flowing from the particulate filter and generates an oxygen signal based on said oxygen level; and
    a control module that receives said particulate filter substrate temperature signal and said oxygen signal and controls regeneration of said particulate filter to maintain said oxygen signal within a range that is a function of said temperature signal.

2. The system of claim 1 wherein said control module controls at least one of airflow and fuel to maintain a desired oxygen level in said exhaust, wherein said desired oxygen level is defined by a control band, and wherein said control band is defined by a plurality of selectable ranges for a plurality of selectable temperatures.

3. The system of claim 1 wherein said selectable temperatures are between five hundred and nine hundred degrees Celsius and said selectable ranges are between zero and ten percent oxygen.

4. The system of claim 1 wherein said control module estimates an accumulation of soot in said particulate filter and controls regeneration based on said estimation.

5. The system of claim 4 further including an inlet exhaust temperature sensor that senses a temperature of exhaust flowing into said particulate filter and generates an exhaust temperature signal based on said temperature of exhaust flowing into said particulate filter and wherein said control module initiates regeneration by commanding engine operation such that said exhaust temperature flowing into said particulate filter is above a soot light-off threshold.

6. The system of claim 1 wherein when said temperature signal indicates a temperature above a selectable threshold, said control module controls regeneration based on said oxygen signal and said temperature signal.

7. The system of claim 6 wherein said threshold is five hundred degrees Celsius.

8. A particulate filter regeneration method for an internal combustion engine system, comprising:
    receiving a substrate temperature signal corresponding to a temperature of a particulate filter substrate;
    receiving an oxygen signal corresponding to an oxygen level in exhaust flowing from said particulate filter; and
    controlling at least one of airflow and fuel based on said oxygen level such that said oxygen level is maintained within a desired range that is a function of said temperature.

9. The method of claim 8 further comprising estimating an accumulation of soot in said particulate filter and wherein said step of controlling is performed if said estimated accumulation exceeds an accumulation threshold.

10. The method of claim 9 further comprising receiving a temperature signal corresponding to an inlet temperature of said particulate filter and controlling at least one of airflow and fuel to said engine such that said inlet temperature is above a soot light-off threshold when said estimated accumulation exceeds an accumulation threshold.

11. The method of claim 8 wherein said desired range for said temperature is between five hundred and nine hundred degrees Celsius.

12. The method of claim 8 wherein said oxygen level is controlled to be within a desired range for a given value of said temperature.

13. The method of claim 12 wherein said desired range for said oxygen level is between zero and ten percent oxygen.

14. The method of claim 8 wherein said step of controlling at least one of airflow and fuel based on said oxygen level continues as long as soot is available to be burned.

15. A system comprising:
a substrate temperature sensor that measures a temperature of a substrate of a particulate filter;
an air fuel sensor that measures an oxygen level in exhaust flowing from the particulate filter; and
a control module that maintains the oxygen level within a range by controlling regeneration of the particulate filer, wherein the range is a function of the temperature.

16. The system of claim 15 wherein the range is defined by a minimum value and a maximum value for each of a plurality of values of the temperature.

17. The system of claim 16 wherein the maximum value is zero for values of the temperature greater than a threshold temperature.

18. The system of claim 17 wherein the minimum value is greater than zero for values of the temperature less than the threshold temperature.

19. The system of claim 17 wherein the minimum and maximum values decrease for increasing values of the temperature.

20. The method of claim 16 wherein the plurality of minimum and maximum values defines a contiguous control band for the oxygen level.

\* \* \* \* \*